United States Patent
Fang et al.

(10) Patent No.: US 9,650,982 B2
(45) Date of Patent: May 16, 2017

(54) LIQUEFIED PETROLEUM GAS BUTANE COMPOSITION DETERMINATION SYSTEMS AND METHODS

(71) Applicant: GM Global Technology Operations LLC, Detroit, MI (US)

(72) Inventors: Xiaoyue Sherry Fang, Markham (CA); Karl H. Kozole, Oshawa (CA)

(73) Assignee: GM Global Technology Operations LLC, Detroit, MI (US)

( * ) Notice: Subject to any disclaimer, the term of this patent is extended or adjusted under 35 U.S.C. 154(b) by 163 days.

(21) Appl. No.: 14/728,315

(22) Filed: Jun. 2, 2015

(65) Prior Publication Data

US 2016/0356234 A1    Dec. 8, 2016

(51) Int. Cl.
  *F02D 41/26*    (2006.01)
  *F02D 41/06*    (2006.01)

(52) U.S. Cl.
  CPC ........... *F02D 41/26* (2013.01); *F02D 41/064* (2013.01)

(58) Field of Classification Search
  CPC ........ F02D 41/26; F02D 41/06; F02D 41/064; F02D 33/00; F02D 33/006
  See application file for complete search history.

(56) References Cited

U.S. PATENT DOCUMENTS

| | | |
|---|---|---|
| 6,748,931 B2 | 6/2004 | Ricco |
| 6,766,269 B2 | 7/2004 | Lee |
| 7,004,147 B2 | 2/2006 | Kang |
| 7,191,772 B2 | 3/2007 | Robitschko et al. |
| 7,373,932 B2 | 5/2008 | Hayashi et al. |
| 7,377,253 B2 | 5/2008 | Washeleski et al. |
| 8,443,785 B2 | 5/2013 | Carter |
| 2004/0099249 A1 | 5/2004 | Lee |
| 2004/0206338 A1 | 10/2004 | Pursifull et al. |
| 2004/0250795 A1 | 12/2004 | Stroia et al. |
| 2009/0159057 A1 | 6/2009 | Pursifull et al. |
| 2009/0187327 A1 | 7/2009 | Grant et al. |
| 2015/0377155 A1* | 12/2015 | Wach ................. F02M 21/0215 123/435 |

* cited by examiner

Primary Examiner — Hieu T Vo (57) ABSTRACT

A fuel control system of a vehicle includes a first storing module that, in response to receipt of a vehicle shutdown command, stores a first temperature of liquefied petroleum gas (LPG) within an LPG fuel rail of an engine and a first pressure of LPG within the LPG fuel rail. A second storing module, in response to receipt of a vehicle startup command, stores a second temperature of LPG within the LPG fuel rail and a second pressure of LPG within the LPG fuel rail. A butane module determines an amount of butane in the LPG based on the first temperature, the first pressure, the second temperature, and the second pressure. A fuel control module controls LPG fueling of the engine based on the amount of butane in the LPG.

20 Claims, 5 Drawing Sheets

LIQUEFIED PETROLEUM GAS BUTANE COMPOSITION DETERMINATION SYSTEMS AND METHODS

FIELD

The present disclosure relates to internal combustion engines and more particularly to liquefied petroleum gas (LPG) vehicle control systems and methods.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into gasoline engines may be regulated via a throttle. The throttle may adjust throttle area, which increases or decreases air flow into the engine. As the throttle area increases, the air flow into the engine increases.

Before being provided to the engine, the LPG is stored in an LPG tank. Optionally, an LPG pump may be implemented to draw LPG from the LPG tank and supply LPG to a vaporizer/regulator. Alternatively, natural vapor pressure may force LPG to the vaporizer/regulator. The vaporizer/regulator transitions LPG from liquid phase to vapor phase and provides vaporized LPG to a fuel rail at a target pressure.

Fuel injectors provide LPG to the engine from the fuel rail. A fuel control system controls the rate that liquefied petroleum gas (LPG) is supplied to the engine to provide a desired air/LPG mixture to the cylinders. Increasing the amount of air and LPG provided to the cylinders generally increases the torque output of the engine.

SUMMARY

In a feature, a fuel control system of a vehicle is described. A first storing module, in response to receipt of a vehicle shutdown command, stores a first temperature of liquefied petroleum gas (LPG) within an LPG fuel rail of an engine and a first pressure of LPG within the LPG fuel rail. A second storing module, in response to receipt of a vehicle startup command, stores a second temperature of LPG within the LPG fuel rail and a second pressure of LPG within the LPG fuel rail. A butane module determines an amount of butane in the LPG based on the first temperature, the first pressure, the second temperature, and the second pressure. A fuel control module controls LPG fueling of the engine based on the amount of butane in the LPG.

In other features, a shutoff valve module transitions a LPG shutoff valve from open to closed when the vehicle shutdown command is received and transitions the LPG shutoff valve from closed to open when the vehicle startup command is received. The LPG shutoff valve enables or disables LPG flow from an LPG tank to an LPG fuel rail of the engine. The first storing module stores the first temperature and pressure after the LPG shutoff valve is closed. The second storing module stores the second temperature and pressure after the vehicle startup command is received and before the LPG shutoff valve is opened.

In other features, the fuel control module disables LPG fueling of the engine for a period after the vehicle startup command is received when the amount of butane in the LPG is greater than a predetermined amount.

In other features, the fuel control module performs gasoline fueling of the engine during the period after the vehicle startup command is received when the amount of butane in the LPG is greater than the predetermined amount.

In other features, a heater module powers an LPG heater for the period after the vehicle startup command is received when the amount of butane in the LPG is greater than the predetermined amount.

In other features, a diagnostic module diagnoses a fault in a component of the vehicle, illuminates a malfunction indicator lamp when the fault is diagnosed, and disables the diagnosis after the vehicle startup command is received when the amount of butane in the LPG is greater than the predetermined amount and a temperature is less than a predetermined temperature.

In other features, the fuel control module increases the period as the amount of butane in the LPG increases.

In other features, the fuel control module decreases the period as the amount of butane in the LPG decreases.

In other features, the vehicle does not include a pressure sensor within an LPG tank.

In other features, the butane module determines an expected pressure based on a predetermined amount of butane, the first temperature, the first pressure, and the second temperature, and indicates whether the amount of butane in the LPG is greater than or less than the predetermined amount of butane based on a comparison of the second pressure and the expected pressure.

In a feature, a fuel control method includes: in response to receipt of a vehicle shutdown command, storing (i) a first temperature of liquefied petroleum gas (LPG) within an LPG fuel rail of an engine and (ii) a first pressure of LPG within the LPG fuel rail; in response to receipt of a vehicle startup command, storing (i) a second temperature of LPG within the LPG fuel rail and (ii) a second pressure of LPG within the LPG fuel rail; determining an amount of butane in the LPG based on the first temperature, the first pressure, the second temperature, and the second pressure; and controlling LPG fueling of the engine based on the amount of butane in the LPG.

In other features, the fuel control method further includes transitioning a LPG shutoff valve from open to closed when the vehicle shutdown command is received and that transitions the LPG shutoff valve from closed to open when the vehicle startup command is received. The LPG shutoff valve enables or disables LPG flow from an LPG tank to an LPG fuel rail of the engine. The first temperature and pressure are stored after the LPG shutoff valve is closed, and the second temperature and pressure are stored after the vehicle startup command is received and before the LPG shutoff valve is opened.

In other features, the fuel control method further includes disabling LPG fueling of the engine for a period after the vehicle startup command is received when the amount of butane in the LPG is greater than a predetermined amount.

In other features, the fuel control method further includes performing gasoline fueling of the engine during the period after the vehicle startup command is received when the amount of butane in the LPG is greater than the predetermined amount.

In other features, the fuel control method further includes powering an LPG heater for the period after the vehicle startup command is received when the amount of butane in the LPG is greater than the predetermined amount.

In other features, the fuel control method further includes disabling diagnosis of a fault in a component of the vehicle after the vehicle startup command is received when the amount of butane in the LPG is greater than the predetermined amount and a temperature is less than a predetermined temperature.

In other features, the fuel control method further includes increasing the period as the amount of butane in the LPG increases.

In other features, the fuel control method further includes decreasing the period as the amount of butane in the LPG decreases.

In other features, the vehicle does not include a pressure sensor within an LPG tank.

In other features, the fuel control method further includes: determining an expected pressure based on a predetermined amount of butane, the first temperature, the first pressure, and the second temperature; and indicating whether the amount of butane in the LPG is greater than or less than the predetermined amount of butane based on a comparison of the second pressure and the expected pressure.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A fuel system supplies liquid petroleum gas (LPG) in a gaseous state to an engine for combustion. An LPG pump may draw LPG from an LPG tank and provide LPG in liquid form to a regulator/vaporizer. In some systems, the LPG pump may be omitted. The regulator/vaporizer transitions LPG from liquid to gas and supplies gaseous LPG to the fuel rail. Fuel injectors supply LPG from the fuel rail to the engine. Some types of engine systems include another fuel system for delivering another type of fuel to the engine. For example, gasoline-LPG engine systems also include a fuel system for delivering gasoline to the engine.

Two constituents of LPG are propane and butane. LPG composition may vary by geographical location, time of year, and for other reasons. At low temperatures, the amount of butane in LPG may affect engine startup. For example, LPG having higher amounts of butane may be unable to sufficiently vaporize at low temperatures. Warming of the LPG and/or use of another fuel (e.g., gasoline) may be used to facilitate engine startup at low temperatures.

According to the present disclosure, a control module determines an amount of butane in the LPG supplied to an engine based on pressure and temperature of LPG within the fuel rail at vehicle shutdown and pressure and temperature of LPG within the fuel rail at vehicle startup. The amount of butane in the LPG can therefore be determined without the need for a tank pressure sensor within the LPG tank. One or more other types of sensors may also not be needed, such as a dedicated LPG fuel composition sensor.

Figure 1A:
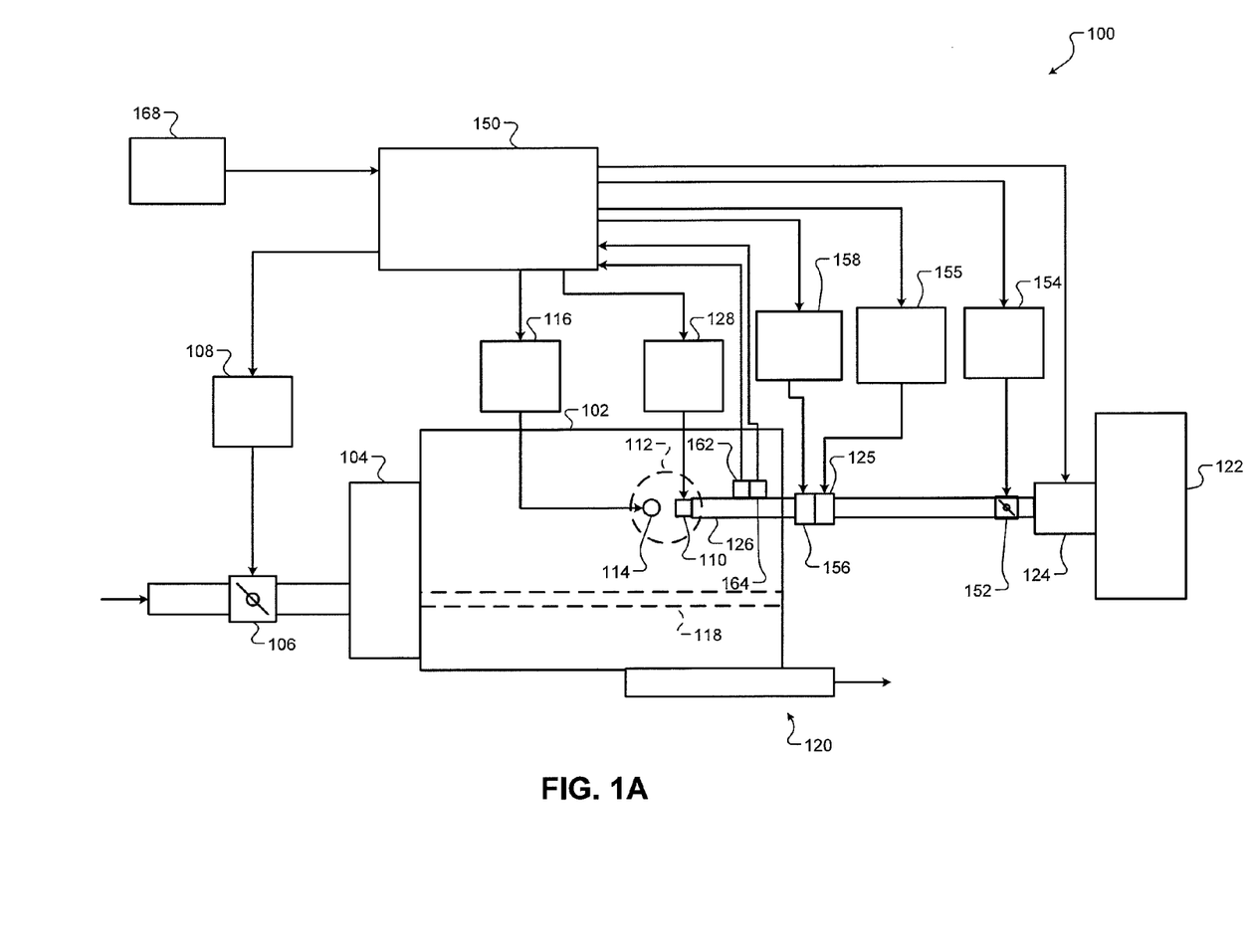
FIGS. 1A and 1B are functional block diagrams of example engine systems of liquefied petroleum gas (LPG) vehicles.

Referring now to FIG. 1A, a functional block diagram of an example engine system 100 of a liquefied petroleum gas (LPG) vehicle is presented. While FIG. 1A includes the example of a mono-fueled engine system, the present application is also applicable to engine systems where LPG and one or more other fuels are combusted, such as gasoline and LPG fueled engine systems.

Air is drawn into an engine 102 through an intake manifold 104. A throttle valve 106 may be actuated by a throttle actuator module 108 to vary airflow into the engine 102. The throttle actuator module 108 may include, for example, an electronic throttle controller (ETC). The air mixes with gaseous LPG injected by one or more fuel injectors, such as fuel injector 110, to form an air/LPG mixture. The air/LPG mixture is combusted within one or more cylinders of the engine 102, such as cylinder 112.

A spark plug 114 may initiate combustion of the air/LPG mixture within the cylinder 112. A spark actuator module 116 controls the provision of spark by the spark plug 114. Although one fuel injector, spark plug, and cylinder are shown, the engine 102 may include more or fewer fuel injectors, spark plugs, and cylinders. For example only, the engine 102 may include 2, 3, 4, 5, 6, 8, 10, or 12 cylinders. A fuel injector and a spark plug may be provided for each cylinder of the engine 102. Drive torque generated by combustion of the air/LPG mixture is output from the engine 102 via a crankshaft 118. Exhaust gas resulting from combustion is expelled from the engine 102 to an exhaust system 120.

Before being provided to the engine 102, the LPG is stored in liquid form in an LPG tank 122. An optional LPG pump 124 may draw LPG from the LPG tank 122 and provides LPG to a pressure regulator valve 125. The LPG pump 124, however, may be omitted and LPG may flow to the pressure regulator valve 125 via pressure within the LPG tank 122. The pressure regulator valve 125 controls pressure of gaseous LPG in a fuel rail 126 based on a target pressure. The fuel rail 126 supplies LPG to the fuel injector 110 and other fuel injectors. A fuel actuator module 128 controls opening of the fuel injector 110 based on signals from a control module 150, such as an engine control module (ECM) or another control module. The control module 150 controls the timing of LPG injection and the amount of LPG injected by the fuel injector 110.

LPG can flow to the pressure regulator valve 125 when a shutoff valve 152 is open. The shutoff valve 152 prevents LPG flow from the fuel tank 122 to the pressure regulator valve 125 when the shutoff valve 152 is closed. A valve actuator module 154 controls actuation of the shutoff valve 152 based on signals from the control module 150. For example, the shutoff valve 152 may be closed after a vehicle shutdown command is received. The shutoff valve 152 may be opened, for example, after a vehicle startup command is received. A user may input vehicle startup and shutdown commands, for example, using one or more ignition keys, buttons, switches, etc. A regulator actuator module 155 may control actuation of the pressure regulator valve 125 based on signals from the control module 150. For example, the control module 150 may adjust opening of the pressure regulator valve 125 based on a target pressure within the fuel rail 126. While a controlled pressure regulator valve 125 is shown and discussed as an example, the pressure regulator valve 125 may be a mechanical valve.

LPG engine systems also include an LPG heater 156. The LPG heater 156 may also be referred to as a vaporizer. The LPG heater 156 may be implemented with the pressure regulator valve 125 within a common housing. The LPG heater 156 may include, for example, a heat exchanger that transfers heat from relatively warmer engine coolant to relatively cooler LPG within the LPG heater 156. The LPG heater 156 transitions LPG from liquid to gas.

Additionally or alternatively, the LPG heater 156 may include a resistive heater or another suitable type of heating device. In the case of a resistive heater, a heater actuator module 158 may also be implemented to control whether the LPG heater 156 is on or off based on signals from the control module 150. The LPG heater 156 may be turned on, for example, when a vehicle startup command is received and the LPG is cold. When the LPG is cold, the LPG may be unable to sufficiently vaporize for combustion. The control module 150 may also control other actuators, such as the throttle actuator module 108 and the spark actuator module 116.

Figure 1B:
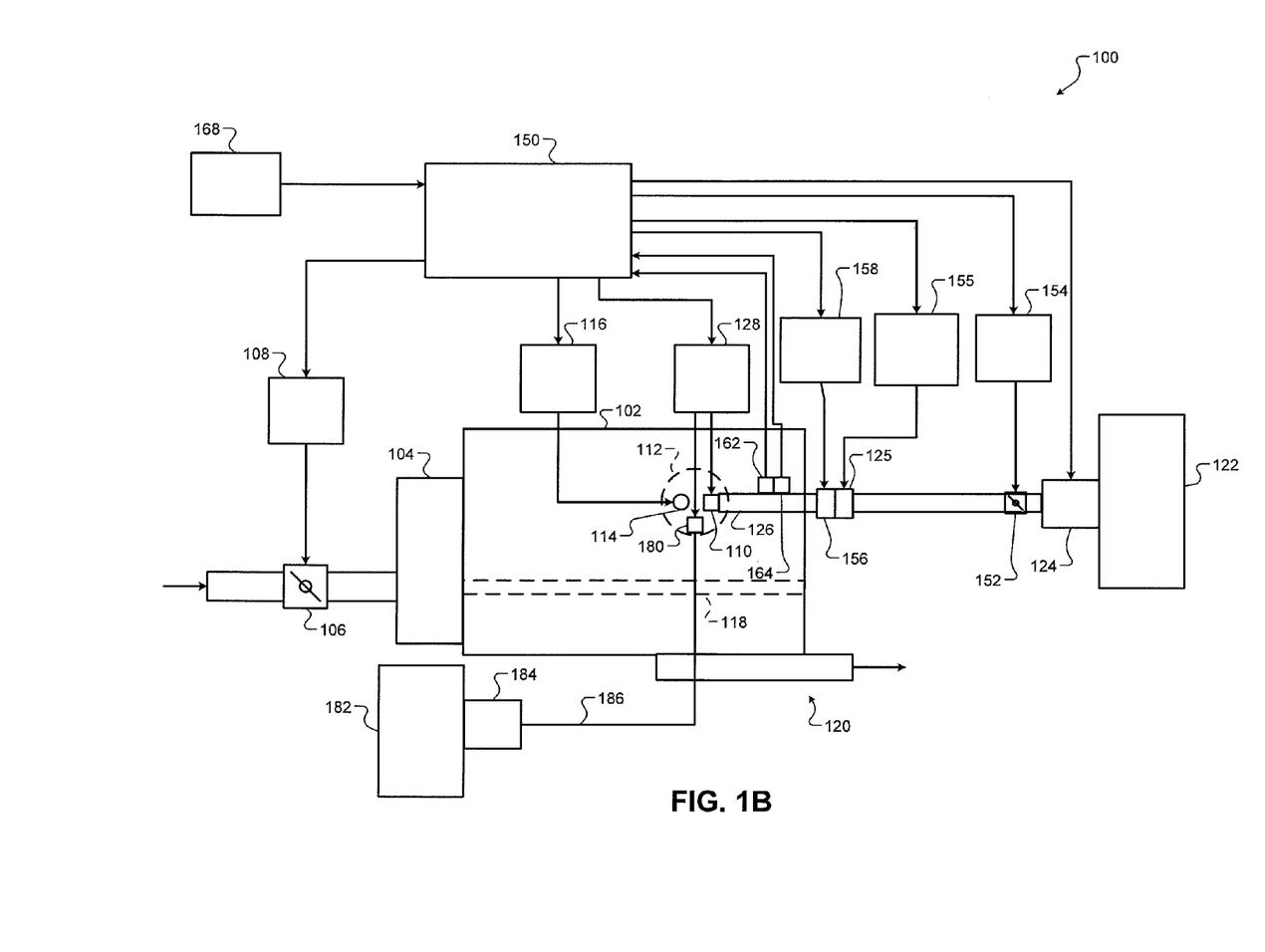

FIG. 1B includes a functional block diagram of an example bi-fuel engine system. Bi-fuel engines are designed to operate using two different fuels using two independent fuel systems. Generally, only one of the two fuels is used at any given time, but a mixture of the two fuels may be used under some circumstances. Gasoline is injected by a fuel injector 180. A (gasoline) fuel injector may be provided for each cylinder. Gasoline is stored in a tank 182.

A pump 184 draws fuel from the tank 182 and pressurizes the gasoline within a fuel rail 186. The fuel rail 186 supplies pressurized gasoline to the fuel injector 180 and other gasoline injectors. The fuel actuator module 128 or another fuel actuator module controls opening of the fuel injector 110 and the fuel injector 180 based on signals from the control module 150 or another control module. For example, the control module 150 may disable LPG fuel injection and perform gasoline injection after a vehicle startup command is received, and the LPG is cold. The control module 150 may disable gasoline injection and enable LPG fuel injection, for example, when a temperature of the LPG reaches a predetermined temperature. The predetermined temperature may be set based on LPG composition (e.g., amount of butane in the LPG). While the example of one control module controlling both LPG and gasoline fueling is provided, two independent control modules and fuel actuator modules may be implemented: one controlling gasoline injection (e.g., engine control module); and one controlling LPG injection (e.g., fuel injector control module).

Referring now to FIGS. 1A and 1B, one or more sensors may be implemented. A rail pressure sensor 162 measures pressure within the (LPG) fuel rail 126 (i.e., rail pressure) and generates a rail pressure signal based on the rail pressure. The rail temperature sensor 164 measures a temperature of the LPG in the fuel rail 126 and generates a rail temperature signal based on the rail temperature. The engine system 100 may also include other sensors 168, such as a mass air flowrate (MAF) sensor, a manifold absolute pressure (MAP) sensor, an intake air temperature (IAT) sensor, an engine speed sensor, and other suitable sensors. However, a tank pressure sensor within the LPG tank 122 may be omitted.

Two primary components of LPG are propane and butane. Butane has a higher vaporization temperature than propane. LPG having higher butane concentrations may affect engine startups at colder temperatures.

According to the present disclosure, the control module 150 determines an amount of butane in the LPG based on pressure and temperature of LPG in the fuel rail 126 when the vehicle is shut down and pressure and temperature of LPG in the fuel rail 126 when the vehicle is next started. The control module 150 may take one or more actions based on the amount of butane in the LPG.

For example, in the example of FIG. 1B, the control module 150 may decrease a period of gasoline injection after engine startups as the amount of butane in the LPG decreases, and vice versa. This may allow the control module 150 to transition to LPG injection sooner at a given startup temperature when the LPG includes lower amount of butane.

As another example, in the example of FIG. 1A, the control module 150 may decrease the period that the LPG heater 156 is turned on before engine startup as the amount of butane in the LPG decreases, and vice versa. This may decrease power consumption and decrease the delay period between commanded vehicle startup and when engine startup can occur. User satisfaction may decrease as the delay period increases.

Figure 2:
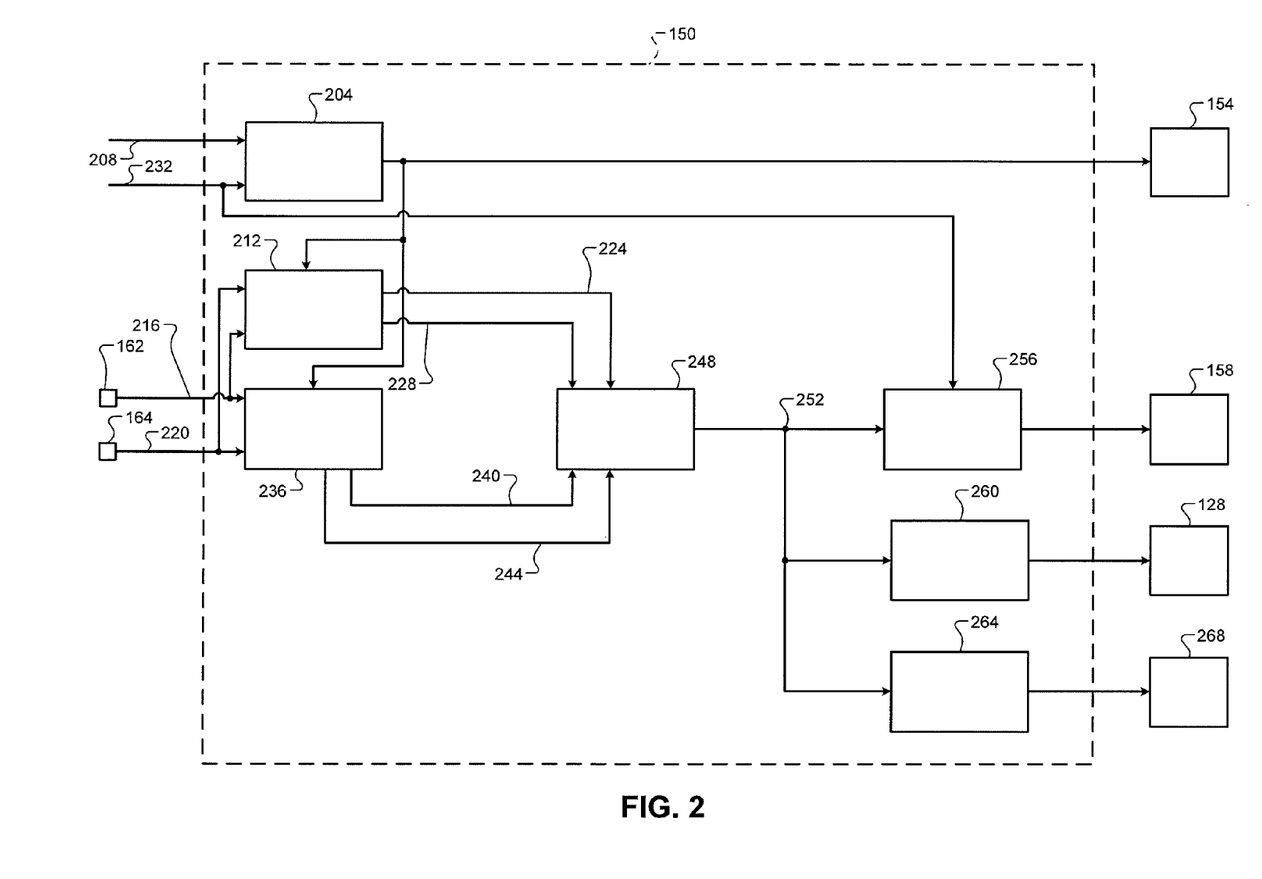
FIG. 2 is a functional block diagram of an example control module.

FIG. 2 includes a functional block diagram of an example implementation of the control module 150. A shutoff valve module 204 controls opening and closing of the shutoff valve 152. For example, the shutoff valve module 204 transitions the shutoff valve 152 from open to closed when a vehicle shutdown command 208 is received. The vehicle shutdown command 208 may be generated, for example, in response to the driver actuating an ignition button, key, or switch to turn off the vehicle.

In response to the shutoff valve module 204 closing the shutoff valve 152 for vehicle shutdown, a first storing module 212 stores a rail pressure 216 and a rail temperature 220. The stored rail pressure and rail temperature will be referred to as a shutdown rail pressure 224 and a shutdown rail temperature 228, respectively. The rail pressure 216 is measured using the rail pressure sensor 162 and indicates a pressure of LPG within the fuel rail 126. The rail temperature 220 is measured using the rail temperature sensor 164 and indicates a temperature of LPG within the fuel rail 126.

The shutoff valve module 204 transitions the shutoff valve 152 from closed to open when a vehicle startup command 232 is received. As discussed below, however, the rail pressure and temperature are stored before the shutoff valve 152 is opened for a vehicle startup. The vehicle startup command 232 may be generated, for example, in response to the driver actuating an ignition button, key, or switch to start the vehicle. The control module 150 starts the engine 102 after the vehicle startup command 232 is received. The control module 150 may, for example, engage and power a starter motor to start the engine 102.

In response to the receipt of the vehicle startup command 232 and before the shutoff valve module 204 opens the shutoff valve 152, a second storing module 236 stores the rail pressure 216 and the rail temperature 220. The stored rail pressure and rail temperature will be referred to as a startup rail pressure 240 and a startup rail temperature 244, respectively.

A butane module 248 estimates an amount (e.g., percentage) of butane 252 in the LPG that is in the LPG tank 122 based on the shutdown rail pressure 224, the shutdown rail temperature 228, the startup rail pressure 240, and the startup rail temperature 244. The butane module 248 may determine the amount of butane 252 in the LPG, for example, using one of a function and a mapping that relates shutdown and startup rail pressures and temperatures to amounts of butane. In various implementations, differences between the shutdown and startup temperatures and pressures may be used to determine the amount of butane 252.

As a condition to estimating the amount of butane 252 in the LPG, the butane module 248 may require that at least a predetermined period pass between the receipt of the vehicle shutdown command 208 and the receipt of the next vehicle startup command 232. The predetermined period may be, for example, 3-5 hours or another suitable period. Satisfaction of this condition, however, may not be required in some implementations. In various implementations, a predetermined temperature drop may be required as a condition to estimating the amount of butane 252 in the LPG. The predetermined temperature drop may be calibratable and set based on the particular application. Satisfaction of this condition, however, may not be required.

Figure 3:
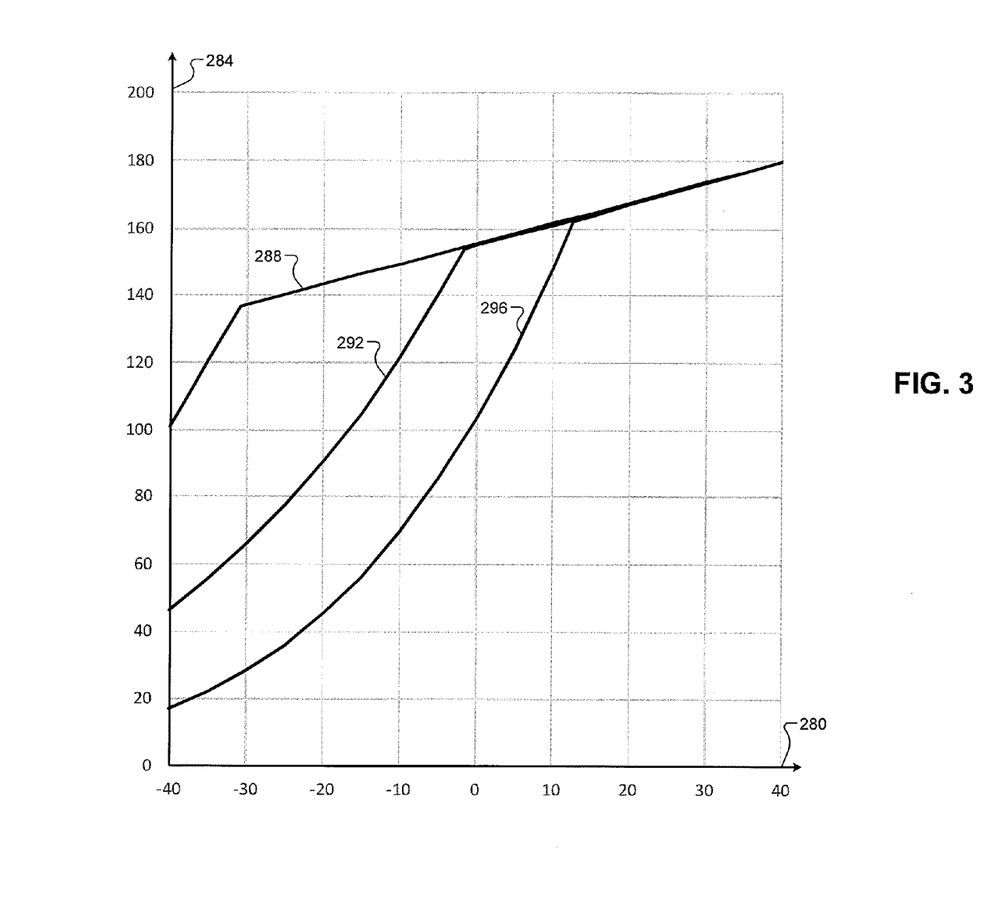
FIG. 3 is an example graph of condensation characteristics for various temperatures and pressures for LPG having different amounts of butane.

FIG. 3 is an example graph of temperature 280 versus pressure 284. Traces 288, 292, and 296 show condensation characteristics of LPG fuel having 5 percent butane, 60 percent butane, and 100 percent butane, respectively, as it is cooled from the same shutdown rail temperature and pressure. As shown, LPG fuels having larger amounts of butane condense at higher temperatures than LPG fuels having smaller amounts of butane. As an approximation, temperature and pressure change may be approximated by the Ideal Gas Law while the LPG remains in the gaseous state, but pressure will decrease more quickly when condensation occurs.

In addition to or as an alternative to determining the amount of butane 252, the butane module 248 may generate the amount of butane 252 to indicate whether (or not) the amount of butane in the LPG is greater than one or more predetermined amounts (e.g., percentage(s)) of butane. The butane module 248 may determine whether the amount of butane in the LPG is greater than a predetermined amount of butane, for example, based on the startup rail pressure 240 relative to an expected startup rail pressure for the predetermined amount of butane given the shutdown rail pressure and temperature 224 and 228 and the startup rail temperature 244. The butane module 248 may determine the expected startup rail pressure for the predetermined amount, for example, using one of a function or mapping that relates startup rail temperatures and shutdown rail pressures and temperatures to expected startup rail pressures for LPG having the predetermined amount of butane.

When the startup rail pressure 240 is less than the expected pressure, the butane module 248 may indicate that the amount of butane in the LPG is greater than the predetermined amount of butane. The startup rail pressure being less than the expected pressure indicates that condensation of the LPG occurred more than what would have been expected for the predetermined amount of butane, thus indicating that the amount of butane in the LPG is greater than the predetermined amount. Conversely, when the startup rail pressure 240 is greater than the expected pressure, the butane module 248 may indicate that the amount of butane in the LPG is less than the predetermined amount of butane.

One or more actions may be taken based on the amount of butane 252. For example, a heater module 256 may determine a period to power the LPG heater 156 before initiating engine startup based on the amount of butane 252 and the startup rail temperature 244. When the startup rail temperature 244 is less than a predetermined temperature when the vehicle startup command 232 is received, the heater module 256 may increase the period that the LPG heater 156 is powered before engine startup is initiated (via the starter motor) as the amount of butane 252 increases, and vice versa. Under these circumstances, a longer period of warming via the LPG heater 156 may be enable the LPG to more fully vaporize.

A fueling module 260 controls LPG fueling of the engine 102. The fueling module 260 may also control fueling via one or more other types of fuel. The fueling module 260 or another fuel control module controls gasoline injection. Engine startup may be initiated when the vehicle startup command 232 is received. The fueling module 260, however, may disable LPG fuel injection and gasoline fuel injection may be performed during and for a predetermined period after engine startup. The fueling module 260 may increase the period that gasoline injection is performed and LPG injection is disabled as the amount of butane 252 increases, and vice versa.

A diagnostic module 264 selectively diagnoses faults in components of the vehicle. The diagnostic module 264 may illuminate a malfunction indicator lamp (MIL) 268 when one or more faults are diagnosed. For example, when the amount of butane 252 is greater than a predetermined amount of butane, the diagnostic module 264 may disable performance of one or more diagnostics having higher temperature thresholds, such as diagnostics on components of the fuel system that supplies LPG to the engine 102. One or more other actions may be taken based on the amount of butane 252.

Figure 4:
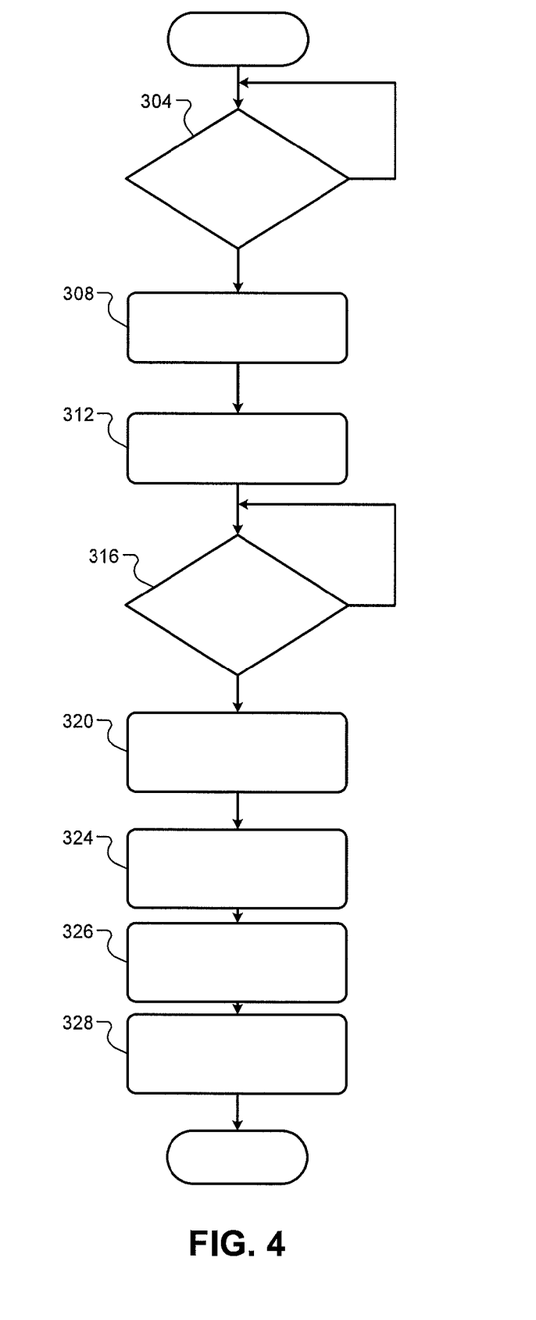
FIG. 4 is a flowchart including an example method of determining an amount of butane in LPG fuel.

FIG. 4 is a flowchart including an example method of determining the amount of butane in LPG fuel. Control begins when the vehicle is on and the engine 102 is running. At 304, the shutoff valve module 204 determines whether a vehicle shutdown command 208 has been received. If 304 is true, control continues with 308. If false, control may remain at 304. The engine 102 is shut down when the vehicle shutdown command 208 is received.

At 308, the shutoff valve module 204 transitions the shutoff valve 152 from open to closed, thereby blocking LPG flow from the LPG tank 122 to the (LPG) fuel rail 126. The fueling module 260 also disables LPG injection at 308. At 312, the first storing module 212 stores the rail pressure 216 as the shutdown rail pressure 224 and stores the rail temperature 220 as the shutdown rail temperature 228.

The shutoff valve module 204 determines whether a vehicle startup command 232 has been received at 316. If 316 is true, control continues with 320. If 316 is false, control may remain at 316 until the vehicle startup command 232 is received. At 320, the second storing module 236 stores the rail pressure 216 as the startup rail pressure 240 and stores the rail temperature 220 as the startup rail temperature 244.

At 324, the butane module 248 determines the amount of butane 252 in the LPG. The butane module 248 determines the amount of butane 252 in the LPG based on the shutdown rail pressure 224, the shutdown rail temperature 228, the startup rail pressure 240, and the startup rail temperature 244. At 326, the shutoff valve module 204 transitions the shutoff valve 152 from closed to open, thereby allowing LPG flow from the LPG tank 122 to the (LPG) fuel rail 126.

One or more actions may be taken based on the amount of butane 252 in the LPG at 328.

For example, engine cranking may be disabled for a period and the heater module 256 may apply power to the LPG heater 156 for the period when the temperature of the LPG is less than a predetermined temperature and the amount of butane 252 is greater than a predetermined amount of butane. The control module 150 may engage and power a starter motor to begin cranking and begin injecting LPG when the period has passed after the receipt of the vehicle startup command 232. In another example, engine cranking may be initiated when the vehicle startup command 232 is received, but LPG fueling may be disabled and gasoline injection may be performed for a period after the vehicle startup command is received when a temperature of the LPG is less than a predetermined temperature and the amount of butane 252 is greater than a predetermined amount of butane. Additionally or alternatively, the diagnostic module 264 may disable performance of one or more diagnostics when a temperature of the LPG is less than a predetermined temperature and the amount of butane 252 is greater than a predetermined amount of butane. While the example of FIG. 4 is shown as ending, control may return to 304.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects.

The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

What is claimed is:

1. A fuel control system of a vehicle, comprising:
    a first storing module that, in response to receipt of a vehicle shutdown command, stores a first temperature of liquefied petroleum gas (LPG) within an LPG fuel rail of an engine and a first pressure of LPG within the LPG fuel rail;
    a second storing module that, in response to receipt of a vehicle startup command, stores a second temperature of LPG within the LPG fuel rail and a second pressure of LPG within the LPG fuel rail;
    a butane module that determines an amount of butane in the LPG based on the first temperature, the first pressure, the second temperature, and the second pressure; and
    a fuel control module that controls LPG fueling of the engine based on the amount of butane in the LPG.

2. The fuel control system of claim 1 further comprising a shutoff valve module that transitions a LPG shutoff valve from open to closed when the vehicle shutdown command is received and that transitions the LPG shutoff valve from closed to open when the vehicle startup command is received,
    wherein the LPG shutoff valve enables or disables LPG flow from an LPG tank to an LPG fuel rail of the engine,
    wherein the first storing module stores the first temperature and pressure after the LPG shutoff valve is closed, and
    wherein the second storing module stores the second temperature and pressure after the vehicle startup command is received and before the LPG shutoff valve is opened.

3. The fuel control system of claim 1 wherein the fuel control module disables LPG fueling of the engine for a period after the vehicle startup command is received when the amount of butane in the LPG is greater than a predetermined amount.

4. The fuel control system of claim 3 wherein the fuel control module performs gasoline fueling of the engine during the period after the vehicle startup command is received when the amount of butane in the LPG is greater than the predetermined amount.

5. The fuel control system of claim 3 further comprising a heater module that powers an LPG heater for the period after the vehicle startup command is received when the amount of butane in the LPG is greater than the predetermined amount.

6. The fuel control system of claim 3 further comprising a diagnostic module that diagnoses a fault in a component of the vehicle, that illuminates a malfunction indicator lamp when the fault is diagnosed, and that disables the diagnosis after the vehicle startup command is received when the amount of butane in the LPG is greater than the predetermined amount and a temperature is less than a predetermined temperature.

7. The fuel control system of claim 3 wherein the fuel control module increases the period as the amount of butane in the LPG increases.

8. The fuel control system of claim 3 wherein the fuel control module decreases the period as the amount of butane in the LPG decreases.

9. The fuel control system of claim 1 wherein the vehicle does not include a pressure sensor within an LPG tank.

10. The fuel control system of claim 1 wherein the butane module determines an expected pressure based on a predetermined amount of butane, the first temperature, the first pressure, and the second temperature, and indicates whether the amount of butane in the LPG is greater than or less than the predetermined amount of butane based on a comparison of the second pressure and the expected pressure.

11. A fuel control method for a vehicle, comprising:
    in response to receipt of a vehicle shutdown command, storing (i) a first temperature of liquefied petroleum gas (LPG) within an LPG fuel rail of an engine and (ii) a first pressure of LPG within the LPG fuel rail;
    in response to receipt of a vehicle startup command, storing (i) a second temperature of LPG within the LPG fuel rail and (ii) a second pressure of LPG within the LPG fuel rail;
    determining an amount of butane in the LPG based on the first temperature, the first pressure, the second temperature, and the second pressure; and
    controlling LPG fueling of the engine based on the amount of butane in the LPG.

12. The fuel control method of claim 11 further comprising:
    transitioning a LPG shutoff valve from open to closed when the vehicle shutdown command is received; and
    transitioning the LPG shutoff valve from closed to open when the vehicle startup command is received,
    wherein the LPG shutoff valve enables or disables LPG flow from an LPG tank to an LPG fuel rail of the engine,
    wherein storing the first temperature and pressure includes storing the first temperature and pressure after the LPG shutoff valve is closed, and
    wherein storing the second temperature and pressure includes storing the second temperature and pressure after the vehicle startup command is received and before the LPG shutoff valve is opened.

13. The fuel control method of claim 11 further comprising disabling LPG fueling of the engine for a period after the vehicle startup command is received when the amount of butane in the LPG is greater than a predetermined amount.

14. The fuel control method of claim 13 further comprising performing gasoline fueling of the engine during the period after the vehicle startup command is received when the amount of butane in the LPG is greater than the predetermined amount.

15. The fuel control method of claim 13 further comprising powering an LPG heater for the period after the vehicle startup command is received when the amount of butane in the LPG is greater than the predetermined amount.

16. The fuel control method of claim 13 further comprising disabling diagnosis of a fault in a component of the vehicle after the vehicle startup command is received when the amount of butane in the LPG is greater than the predetermined amount and a temperature is less than a predetermined temperature.

17. The fuel control method of claim 13 further comprising increasing the period as the amount of butane in the LPG increases.

18. The fuel control method of claim 13 further comprising decreasing the period as the amount of butane in the LPG decreases.

19. The fuel control method of claim 11 wherein the vehicle does not include a pressure sensor within an LPG tank.

20. The fuel control method of claim 11 further comprising:
    determining an expected pressure based on a predetermined amount of butane, the first temperature, the first pressure, and the second temperature; and indicating whether the amount of butane in the LPG is greater than or less than the predetermined amount of butane based on a comparison of the second pressure and the expected pressure.

* * * * *